3,320,288
BIS - (4 - DIALKYLAMINO - PHENYL) - (4 - CYCLO-HEXYLAMINO-NAPHTHYL)-METHANE DYES
Ludwig Bettag, Freiburg im Breisgau, and Emil Kern, Albert Palm, Walter Seibert, and Emil Weiss, Ludwigshafen (Rhine), Germany, assignors to Badische Anilin- & Soda - Fabrik Aktiengesellschaft, Ludwigshafen (Rhine), Germany
No Drawing. Filed Aug. 13, 1963, Ser. No. 301,889
Claims priority, application Germany, Sept. 19, 1962, B 68,909
4 Claims. (Cl. 260—388)

This invention relates to new alcohol-soluble triarylmethane dyes.

A blue triarylmethane dye having the Formula I:

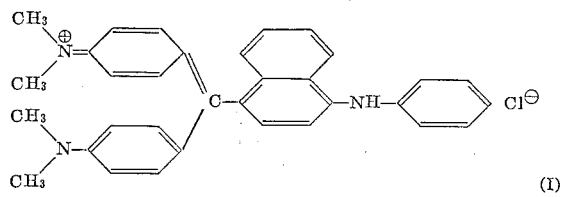

is known as Victoria Blue B (Colour Index 44,045). This dye is mainly used in the form of alcoholic solutions for offset printing but upon prolonged standing it tends to separate out from these solutions in crystalline or amorphous form. Consequently such solutions cannot be kept for any length of time in a condition ready for use and furthermore pipes supplying the dye to the offset printing machine readily become clogged. Apart from the fact that the shutting down of an offset printing machine thereby occasioned is attended by great economic loss, the cleaning of the clogged pipes is extremely troublesome because of the very intense color strength of this dye.

It is an object of this invention to provide new dyes which do not have the said disadvantages and which are therefore more suitable for offset printing.

A further object of the invention is to provide dyes which have better solubility in alcohol and castor oil than comparable prior art dyes and which are therefore better to handle industrially. Another object is to provide dyes which are more suitable as hectograph colors than comparable prior art dyes and for example give a clearer print.

We have found that the above and further objects are achieved by triarylmethane dyes having the general Formula II:

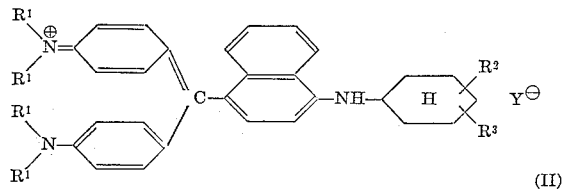

in which $R^1$ denotes a low molecular weight alkyl group and $R^2$ and $R^3$ are hydrogen or identical or different aliphatic, cycloaliphatic or aliphatic-cycloaliphatic radicals which may be connected to form an anellated cycloaliphatic ring and in which Y denotes chlorine or bromine.

Dyes having the general Formula II are obtained by conventional methods, for example from p,p'-bis-dialkyl-aminobenzophenones of the general Formula III:

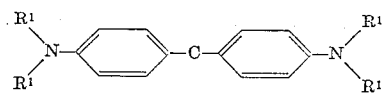

by condensation with secondary amines having the general Formula IV:

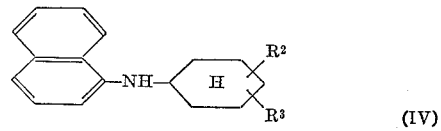

in the presence of a condensing agent yielding a chlorine or bromine ion.

Initial materials having the general Formula III are for example 4,4'-bis-dimethylaminobenzophenone and 4,4'-bis-diethylaminobenzophenone.

Examples of compounds having the general Formula IV are 1-naphthylcyclohexylamine and its derivatives substituted for example in the cyclohexyl group with one or two methyl, ethyl, isopropyl, cyclohexyl or methylcyclohexyl groups, and also 1-naphthyl-1'-decahydronaphthylamine or 1-naphthyl-2'-decahydronaphthylamine.

Suitable condensing agents for affecting reaction between the compounds III and IV to form dyes II are for example phosphorus trichloride, phosphorus tribromide, phosphorus pentachloride, phosphorus oxychloride, phosphorous oxybromide and phosgene. In other respects the reaction may be carried out conventionally; the same is true of the working up of the reaction mixture and the isolation of the dyes.

Secondary amines having the general Formula IV are obtainable by conventional methods, for example from 1-naphthylamine or 1-naphtol by condensation with cyclohexylamine or its derivatives as defined at elevated temperature with or without condensing agents.

The dyes obtainable according to this invention are outstandingly suitable for offset printing (flexographic printing) because they have better solubility in alcohol than comparable prior art dyes. In particular, such solutions remain stable for several weeks, i.e. the dye does not separate out either in amorphous or crystalline form. For this reason these dyes do not cause any difficulties when used on an industrial scale due to clogging of pipes.

The new dyes are also better soluble than prior art dyes in many other solvents, including caster oil. This good solubility in caster oil is important for the manufacture of carbon papers so that the new dyes also represent an advance in this branch of industry.

The new dyes may also be used for the manufacture of blue hectograph papers; they may be incorporated without trouble into the wax mixtures used for this purpose and prints obtained with such hectograph papers exhibit a particularly sharp, clear and easily legible reddish blue copy. It has moreover been found by experience that the reddish blue shade of color is preferred to a pure blue or greenish blue shade of color.

The new dyes are also compatible with organic compositions, such as waxes, lacquer binders, for example nitrocellulose lacquers, and plastics and may be used for coloring these materials.

The following examples will further illustrate this invention. The parts and percentages are by weight.

*Example 1*

A mixture of 268 parts of 4,4'-bis-dimethylamino-benzophenone, 270 parts of toluene and 225 parts of cyclohexyl-1-naphthylamine (boiling point 195° to 200° C./2 mm.) has gradually added to it at 50° C. 164 parts of phosphorus oxychloride while stirring. The whole is heated on a water-bath for about an hour and the intensely colored reaction mixture is poured into 3000 parts of water. After stirring for a short time on a steam bath, the product is neutralized with 420 parts of 25% caustic soda solution and the remainder of the toluene is removed by steam distillation. Stirring is continued and the dye formed separates in crystalline form. It is filtered off and dried at 90° C. in vacuo.

The dye obtained dissolves only slightly in hot water; 70 grams dissolves in 1 liter of ethanol without leaving any residue; solubility in caster oil is 5%.

The dye may be used for coloring nitrocellulose lacquer, synthetic resin spirit lacquer and spirit shellac solutions.

*Example 2*

A mixture of 324 parts of 4,4'-bis-diethylaminobenzophenone and 320 parts of toluene have added thereto at 60° C. 164 parts of phosphorus oxychloride while stirring. When the spontaneous reaction is over, 225 parts of cyclohexyl-1-naphthylamine (boiling point 195° to 200° C./2 mm.) is allowed to flow in and the whole is heated on a waterbath for another one to two hours. The product is worked up as described in Example 1. 555 parts of a dye is obtained which crystallizes out upon cooling. The solubility of the dye in alcohol and castor oil is even somewhat better than that of the dye obtained according to Example 1.

*Example 3*

82 parts of phosphorus oxychloride is added at 50° C. while stirring to a mixture of 134 parts of 4,4'-bis-dimethylaminobenzophenone, 130 parts of a commercial xylene mixture and 160 parts of 4(1'-naphthylamino)-dicyclohexylmethane (boiling point 265° to 275° C./1 mm.). The whole is heated on a waterbath for one hour and the reaction mixture then poured into 2000 parts of water. Stirring is continued on the waterbath and the excess acid is neutralized with 210 parts of a 25% caustic soda solution, the whole cooled, the almost colorless mother liquor poured off from the deposited dye and the amorphous dye is stirred with about 450 parts of the commercial xylene mixture until the dye has become crystalline. It is then filtered off and dried in vacuo at 70° C.

267 parts of a blue dye is obtained. It is only very slightly soluble in hot water but dissolves well in alcohol. It is eminently suitable, among other things, for use in offset printing and for the production of carbon papers.

*Example 4*

132 parts of phosphorus oxychloride is added while stirring to a mixture of 134 parts of 4,4'-bis-dimethyl-aminobenzophenone, 120 parts of toluene and 119.5 parts (3'-methylcyclohexyl)-α-naphthylamine (boiling point 210–215° C. at 8 mm. Hg, $n$ 20/D=1.6153). The whole is heated for one and a half hours on a waterbath and then poured into 1500 parts of water. After stirring on the waterbath the excess acid is neutralized with 330 parts of 25% sodium hydroxide solution. The resultant mass is stirred twice for 10 to 15 minutes, each time with 400 parts of xylene, and the dye is thus crystallized. After filtration, the product is dried at 70° C. in vacuo.

261 parts of a blue dye is obtained. It dissolves only very slightly in hot water, but at least 70 g. dissolves in one liter of 98% alcohol. It lends itself admirably for use in offset printing and for the manufacture of carbon paper. The dye is only slightly different in shade from the one obtainable according to Example 1.

*Example 5*

198 parts of phosphorus oxychloride is added at 60° C. while stirring to a mixture of 201 parts of 4,4'-bis-dimethylaminobenzophenone, 180 parts of toluene and 179 parts of (2'-methylcyclohexyl)-α-naphthylamine (boiling point 187–192° C./8 mm., melting point 59–61° C.). The whole is heated for an hour on a waterbath and poured into 2500 parts of water. While stirring on the waterbath the excess acid is neutralized with 460 parts of 25% sodium hydroxide solution. The resultant crystalline dye is stirred three times for 10 minutes on a steam bath, each time with 600 parts of xylene. After filtration, the product is dried at 70° C. in vacuo.

373 parts of a blue dye is obtained. It dissolves only very slightly in hot water, but at least 70 g. dissolves in one liter of 98% alcohol. It lends itself admirably for use in offset printing and for the manufacture of carbon paper. The dye is only slightly different in shade from the one obtainable according to Example 1.

We claim:

1. A dye of the formula

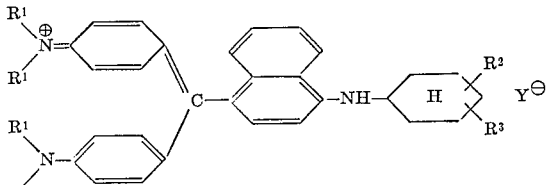

wherein:

$R^1$ represents lower alkyl;

$R^2$ represents a member selected from the group consisting of hydrogen, lower alkyl, cyclohexyl, cyclohexylmethylene and methylcyclohexyl;

$R^3$ represents a member selected from the group consisting of hydrogen and lower alkyl;

$R^2$ and $R^3$ when taken together with the structure

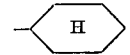

further represent decahydronaphthyl; and

Y is a halogen atom selected from the group consisting of chlorine and bromine.

2. The dye of the formula:

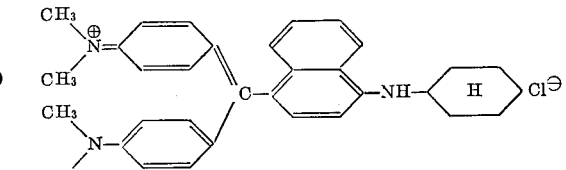

3. The dye of the formula:

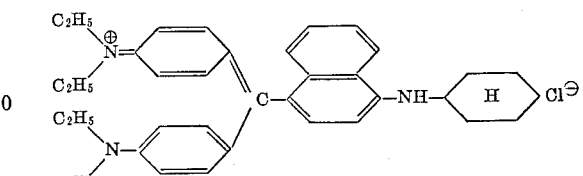

4. The dye of the formula:

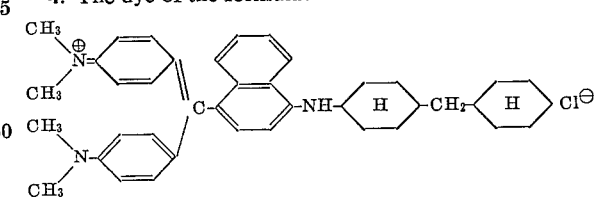

References Cited by the Examiner

UNITED STATES PATENTS 297,414   4/1884   Kern _____ 260—388

FOREIGN PATENTS 411,385   4/1925   Germany.

LORRAINE A. WEINBERGER, *Primary Examiner.*

HAROLD C. WEGNER, *Assistant Examiner.*